United States Patent
Shirota et al.

(10) Patent No.: US 10,433,570 B2
(45) Date of Patent: Oct. 8, 2019

(54) METHOD FOR RECOVERING PROTEINS FROM WASTE WATER DISCHARGED DURING PROCESS OF PRODUCING FISH MEAT PROCESSED PRODUCT

(71) Applicant: MARUHA NICHIRO CORPORATION, Koto-ku (JP)

(72) Inventors: Kazuya Shirota, Tsukuba (JP); Ryusuke Nakashima, Seattle, WA (US); Shin-ichiro Nishimoto, Tsukuba (JP); Kenji Funaki, Koto-ku (JP); Takeshi Suzuki, Seattle, WA (US); Itaru Kawada, Bellingham, WA (US)

(73) Assignee: MARUHA NICHIRO CORPORATION, Koto-ku (JP)

( * ) Notice: Subject to any disclaimer, the term of this patent is extended or adjusted under 35 U.S.C. 154(b) by 633 days.

(21) Appl. No.: 14/911,679

(22) PCT Filed: Aug. 8, 2014

(86) PCT No.: PCT/JP2014/070993
§ 371 (c)(1),
(2) Date: Feb. 11, 2016

(87) PCT Pub. No.: WO2015/022913
PCT Pub. Date: Feb. 19, 2015

(65) Prior Publication Data
US 2016/0198737 A1    Jul. 14, 2016

(30) Foreign Application Priority Data
Aug. 13, 2013    (JP) .................................. 2013-168020

(51) Int. Cl.
*A23J 1/04*    (2006.01)
*A23J 1/00*    (2006.01)
*A23L 17/10*    (2016.01)

(52) U.S. Cl.
CPC ................. *A23J 1/04* (2013.01); *A23J 1/001* (2013.01); *A23L 17/10* (2016.08)

(58) Field of Classification Search
None
See application file for complete search history.

(56) References Cited

FOREIGN PATENT DOCUMENTS

| CN | 1217890 A | 6/1999 |
|---|---|---|
| CN | 102757491 A | 10/2012 |

(Continued)

OTHER PUBLICATIONS

Guerrero et al., "Protein Recover During the Overall Treatment of Wastewaters From Fish-Meal Factories"—Bioresource Technology, 63 (1998) pp. 221-229. (Year: 1998).*

(Continued)

*Primary Examiner* — Elizabeth Gwartney
(74) *Attorney, Agent, or Firm* — Oblon, McClelland, Maier & Neustadt, L.L.P.

(57) ABSTRACT

According to the present invention, a method for recovering useful fish meat proteins from waste water generated during fish paste or fishmeal production is provided. The provided is a method for recovering water-soluble proteins from fish paste leaching waste water or stick water, comprising: adjusting the pH of fish paste leaching waste water or stick water to 4.5-5.5 to insolubilize water-soluble proteins; heating the insolubilized proteins to 30° C. to 90° C. to cause the proteins to flocculate so as to form flocs; subjecting the flocs to solid-liquid separation using a decanter centrifuge during heating; and recovering proteins in the form of solid content.

4 Claims, 2 Drawing Sheets

(56) References Cited

FOREIGN PATENT DOCUMENTS

| JP | 41-132 B1 | 1/1966 |
|---|---|---|
| JP | 58-60950 A | 4/1983 |
| JP | 10-76279 A | 3/1998 |
| JP | 11-285603 A | 10/1999 |
| JP | 11-347593 A | 12/1999 |
| JP | 2001-129590 A | 5/2001 |
| JP | 2003-251365 A | 9/2003 |
| JP | 2004-174305 A | 6/2004 |
| JP | 2007-166989 A | 7/2007 |

OTHER PUBLICATIONS

Kousoulaki et al., "The water soluble fraction in fish meal (stickwater) stimulates growth in Atlantic salmon (*Salmo salar* L.) given high plant protein diets"—Aquaculture, 289 (2009) pp. 74-83. (Year: 2009).*

Stine et al., "Recovery and Utilization of Protein Derived From Surimi Wash-Water"—Journal of Food Quality, 35 (2012) pp. 43-50 (Year: 2012).*

Igarashi et al.—JP 58060950, JPO machine translation (Year: 1983).*

Emiko Okazaki, "A Study on the Recovery and Utilization of Sarcoplasmic Protein of Fish Meat Discharged during the Leaching Process of Surimi Processing", Bull. Natl. Res. Inst. Fish. Sci., No. 6, 1994, pp. 79-160 (with English Abstract).

"Development of Advanced Utilization Technologies of Red Meat Fish with Big Catch: Development of Utilization Technologies of Fishery Processing Waste and the Like: Summary of Research Results", Fiscal Year 1978, Research Section, Research Division, Fisheries Agency, 1979, 18 pages (with English translation).

"Development of Advanced Utilization Technologies of Red Meat Fish with Big Catch: Development of Utilization Technologies of Fishery Processing Waste and the Like: Summary of Research Results", Fiscal Year 1979, Research Section, Research Division, Fisheries Agency, 1980, 31 pages (with English translation).

"Development of Advanced Utilization Technologies of Red Meat Fish with Big Catch: Development of Utilization Technologies of Fishery Processing Waste and the Like: Summary of Research Results", Fiscal Year 1980, Research Section, Research Division, Fisheries Agency, 1981, 26 pages (with English translation).

"Development of Advanced Utilization Technologies of Red Meat Fish with Big Catch: Development of Utilization Technologies of Fishery Processing Waste and the Like: Summary of Research Results", Fiscal Year 1981, Research Section, Research Division, Fisheries Agency, 1983, 15 pages (with English translation).

International Search Report dated Oct. 28, 2014 in PCT/JP2014/070993 filed Aug. 8, 2014.

Comprehensive Encyclopedia of Food Industry, 1979, pp. 621-622 (with partial English language translation).

Combined Office Action and Search Report dated Nov. 2, 2018 in Chinese Patent Application No. 201480043789.7, citing document AO therein, 7 pages (with English translation of categories of cited documents).

* cited by examiner

METHOD FOR RECOVERING PROTEINS FROM WASTE WATER DISCHARGED DURING PROCESS OF PRODUCING FISH MEAT PROCESSED PRODUCT

TECHNICAL FIELD

The present invention relates to a method for recovering useful fish meat proteins from waste water generated during the process of producing minced fish meat (surimi, fish paste) or fishmeal.

BACKGROUND ART

The fish paste production process includes a water leaching step for leaching water from fish meat. This step makes it possible to remove substances contained in fish meat that inhibit gel formation, thereby improving the elasticity of the fish paste. However, water leaching causes the overflow of large amounts of water-soluble proteins in fish meat into leaching water, which has been problematic in terms of the effective use of natural resources and water treatment of leaching waste water.

A variety of methods for recovering proteins that have been discharged into fish paste leaching waste water by insolubilizing the proteins and recovering the insolubilized proteins via solid-liquid separation in a step of fish meat water leaching have been developed.

For instance, two-stage pH shift methods, which comprise acidizing fish paste leaching waste water, neutralizing the water to insolubilize water-soluble proteins, and recovering the insolubilized proteins, have been reported (see Non-Patent Documents 1-4). Proteins that have been insolubilized via two-stage pH shift methods to flocculate (form flocs) can be easily separated using a centrifuge at the laboratory level. However, since such proteins have low flocculation capacity, it has been difficult to carry out continuous solid-liquid separation at the factory level.

In view of the above, solid-liquid separation methods involving pressure flotation, which comprise allowing proteins to flocculate with the use of a inorganic flocculation agent such as polyaluminum chloride (PAC) or a synthetic polymer flocculation agent, have been developed (see Patent Documents 1-5). However, these methods are limited in terms of the usage of recovered proteins because of the use of flocculation agents. In addition, separation via pressure flotation results in large moisture content in the recovered product, which in turn requires a dewatering step. Accordingly, yield reduction and further quality deterioration of waste liquid are problematic.

Meanwhile, in addition to the above methods for recovering proteins in fish paste waste liquid, a method for removing, as unwanted matter, proteins in waste water generated during starch production has been developed, the method comprising subjecting waste water to isoelectric point treatment at pH 3.5-5 or heating at 60° C. to 90° C. to insolubilize unnecessary proteins (see Patent Document 6). Since the object of this method was not the effective use of insolubilized proteins, changes in physical properties of insolubilized proteins were not taken into account.

CITATION LIST

Patent Documents

Patent Document 1: JP Patent Publication (Kokai) No. 2003-251365 A
Patent Document 2: JP Patent Publication (Kokai) No. H10-76279 A
Patent Document 3: JP Patent Publication (Kokai) No. H11-285603 A
Patent Document 4: JP Patent Publication (Kokai) No. H11-347593 A
Patent Document 5: JP Patent Publication (Kokai) No. 2004-174305 A
Patent Document 6: JP Patent Publication (Kokai) No. 2001-129590 A Non-Patent Documents Non-Patent Document 1: "Development of Technology for Utilizing Fishery Processing Waste for 1978," the Fisheries Agency, Research Department, Research Division (pp. 408-414)
Non-Patent Document 2: "Development of Technology for Utilizing Fishery Processing Waste for 1979," the Fisheries Agency, Research Department, Research Division (pp. 505-517)
Non-Patent Document 3: "Development of Technology for Utilizing Fishery Processing Waste for 1980," the Fisheries Agency, Research Department, Research Division (pp. 331-341)
Non-Patent Document 4: "Development of Technology for Utilizing Fishery Processing Waste for 1981," the Fisheries Agency, Research Department, Research Division (pp. 263-268)

SUMMARY OF THE INVENTION

Problems to Be Resolved by the Invention

An object of the present invention is to provide a method for recovering useful fish meat proteins from waste water generated during the fish paste or fishmeal production process at high recovery rates in a rapid and convenient manner without causing excessive denaturation.

Means for Resolving the Problems

The present inventors conducted intensive studies of a method for recovering proteins from fish paste leaching waste water generated during the fish paste production process, whereby proteins can be easily recovered at high recovery rates without the use of a flocculation agent or excessive heating, thereby making it possible to reuse recovered proteins for food.

First, the present inventors found that when water-soluble proteins that have been insolubilized through a two-stage pH shift are subjected to solid-liquid separation, solid-liquid separation of the proteins at high recovery rates becomes possible without the use of a flocculation agent by allowing the proteins to flocculate by heating so as to form flocs. The present inventors further found that high recovery rates can be achieved via a one-stage pH shift to mild acidity without a two-stage pH shift.

Regarding heating, the higher the temperature, the higher the degree of dewatering of a recovered product; however, high temperatures cause the recovered product to have poor properties in terms of edibility. Therefore, the present inventors examined heating at lower temperatures, and accordingly found that high recovery rates can be achieved by heating even at 30° C. to 60° C.

The present inventors also found that when proteins subjected to a combination of a one-stage pH shift and heating at 30° C. to 60° C. are recovered by a decanter centrifuge, large amounts of moisture can be removed, and at the same time, the ash content remarkably decreases.

The present inventors eventually found that high-quality proteins can be recovered at high recovery rates from fish paste leaching waste water by combining a one-stage pH shift and heating at 30° C. to 60° C. and using a decanter centrifuge. This has led to the completion of the present invention.

Moreover, it was possible to apply the method of the present invention to waste liquid discharged during fishmeal production steps, which is called stick water, at a heating temperature of 30° C. to 90° C. Properties of the recovered proteins confirmed that the proteins are appropriate for fish paste fillers or fishmeal raw materials.

Specifically, the present invention is described as follows.

[1] A method for recovering water-soluble proteins from fish paste leaching waste water or stick water, comprising: adjusting the pH of fish paste leaching waste water or stick water to 4.5-5.5 to insolubilize water-soluble proteins; heating the insolubilized proteins to 30° C. to 90° C. to cause the proteins to flocculate so as to form flocs; subjecting the flocs to solid-liquid separation using a decanter centrifuge during heating; and recovering proteins in the form of solid content.

[2] The method according to [1], which is a method for recovering water-soluble proteins from fish paste leaching waste water, comprising: adjusting the pH of fish paste leaching waste water to 4.5-5.5 to insolubilize water-soluble proteins; heating the insolubilized proteins to 30° C. to 60° C. to cause the proteins to flocculate so as to form flocs; subjecting the flocs to solid-liquid separation using a decanter centrifuge during heating; and recovering proteins in the form of solid content.

[3] The method according to [1], which is a method for recovering water-soluble proteins from stick water, comprising: adjusting the pH of stick water to 4.5-5.5 to insolubilize water-soluble proteins; heating the insolubilized proteins to 60° C. to 90° C. to cause the proteins to flocculate so as to form flocs; subjecting the flocs to solid-liquid separation using a decanter centrifuge during heating; and recovering proteins in the form of solid content.

[4] The method according to any one of [1] to [3], wherein the ash content in matter containing recovered proteins accounts for 3% by weight or less of matter containing recovered proteins after drying.

[5] A method for producing fish paste which comprises adding water-soluble proteins as a fish paste filler, or a method for producing fishmeal which comprises using water-soluble proteins as a raw material, wherein the water-soluble proteins are recovered in the form of solid content from fish paste leaching waste water by the method according to any one of [1], [2], and [4].

[6] A method for producing fishmeal, which comprises using water-soluble proteins as a raw material, wherein the water-soluble proteins are recovered in the form of solid content from stick water by the method according to any one of [1], [3], and [4].

This description includes part or all of the content as disclosed in the description and/or drawings of Japanese Patent Application No. 2013-168020, which is a priority document of the present application.

Effects of the Invention

According to the method of the present invention, useful proteins can be recovered from fish paste leaching waste water or stick water by combining a one-stage pH shift and heating at 30° C. to 60° C. or 30° C. to 90° C. and using a decanter centrifuge without the use of a flocculation agent. Also, according to the method of the present invention, proteins can be recovered at high recovery rates in a rapid and convenient manner. Further, recovered proteins can be used for food because flocculation agents are not used. Furthermore, neither an extreme pH shift nor excessive heating takes place, and thus it is possible to suppress the denaturation of recovered proteins. Therefore, high-quality food can be produced when producing a processed food using recovered proteins. Moreover, the ash content in matter containing proteins recovered by the method of the present invention is lower than such content in matter containing proteins recovered by conventional methods. This is because effects of flocculation induced by heating result in improved solid-liquid separation performance, and the use of a decanter centrifuge prevents ash contained in liquid from being transferred to solid content.

As stated above, the method of the present invention simultaneously enables recovery of proteins at high rates and reduction of the ash content in a continuous manner at the industrial level.

EMBODIMENTS FOR CARRYING OUT THE INVENTION

Figure 1:
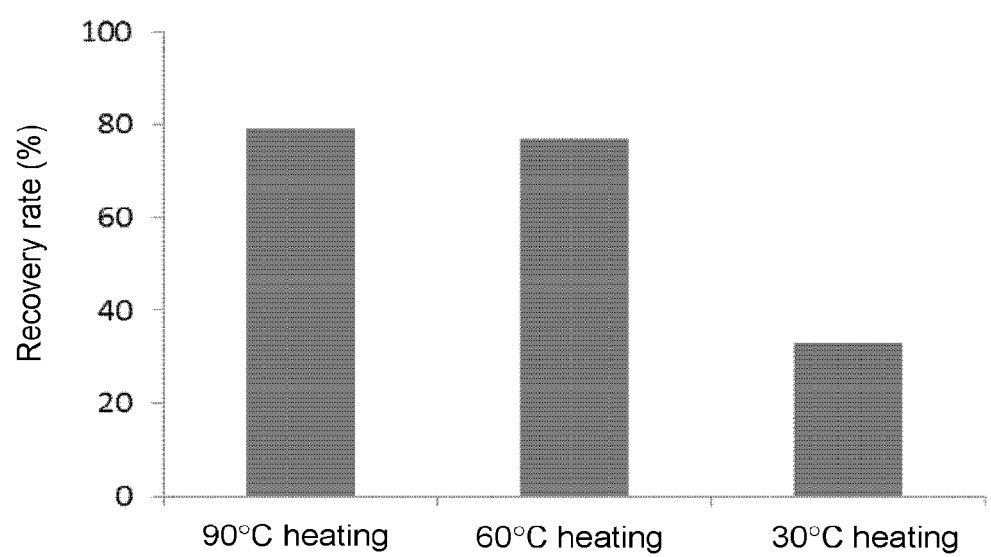
FIG. 1 shows the recovery rates of the water-soluble protein at different temperatures.

Hereafter, the present invention is described in detail.

The present invention encompasses a method for recovering water-soluble proteins from fish paste leaching waste water or stick water.

Fish paste can be obtained by steps of: using, as a raw material, fish such as Alaska pollack, southern blue whiting, Pacific whiting, lizardfish, New Zealand hoki, mackerel, or saury; collecting meat from fish bodies; removing blood; performing water leaching, pulverizing the resulting fish meat; and carrying out dewatering. The fish paste production process includes a water leaching step for water leaching of fish meat to remove substances contained in fish meat that prevent gel formation, thereby improving the elasticity of fish paste. In the water leaching step, large amounts of fish meat proteins flow out into waste liquid.

In addition, fishmeal in a powder form can be produced using, as raw material, fish paste residue obtained during production of a fish meat processed product or the like from fish paste. Fishmeal is mainly used for feed for livestock and cultured fish. Fishmeal is produced by boiling fish paste residue with a cooker, squeezing the boiled residue (fish bodies) using a screw press, and drying the residue to obtain a fish powder. Useful oil can be extracted from liquid obtained by squeezing the fish bodies. Water-soluble matter free of oil is called "stick water." Stick water also contains large amounts of fish meat proteins.

The present invention encompasses a method for recovering water-soluble fish meat proteins from fish paste leaching waste water or stick water that is discharged as waste liquid containing such proteins.

According to the method of the present invention, the pH of fish paste leaching waste water or stick water is mildly acidified so as to insolubilize water-soluble proteins, insolubilized proteins are heated to cause the proteins to flocculate for floc formation, and then solid-liquid separation is performed to recover flocculating proteins in a solid form.

In the above pH adjustment step, the pH is adjusted to a level corresponding to the isoelectric point of fish meat protein. Specifically, the pH is 4-6, preferably 4.5-5.5, more preferably 4.7-5.3, further preferably 4.8-5.2, furthermore preferably 4.9-5.1, and particularly preferably 5.0. The pH can be adjusted by adding an acid such as concentrated hydrochloric acid to fish paste leaching waste water or stick water. The method of the present invention does not require two-stage pH adjustment comprising neutralizing pH that has been mildly acidified to result in neutrality. Therefore, one-stage pH adjustment is satisfactory for the present invention. To change the pH of a solution via one-stage pH adjustment is referred to as a "one-stage pH shift."

When pH is mildly acidified, water-soluble proteins are precipitated, which makes fish paste leaching waste water or stick water cloudy.

Next, fish paste leaching waste water in which water-soluble proteins have been precipitated is heated. Heating is carried out at 30° C. to 60° C. The upper limit of the heating temperature is preferably 59° C., more preferably 57° C., and further preferably 55° C. The lower limit of the heating temperature is preferably 35° C., more preferably 40° C., further preferably 45° C., furthermore preferably 50° C., and particularly preferably 55° C. Heating can be carried out while stirring fish paste leaching waste water by means of a stirrer or bubbling until the above temperature is achieved. Specifically, for example, heating is carried out to reach 60° C. According to the present invention, heating to 60° C. is equivalent to heating at 60° C. Alternatively, heating can be carried out via stirring for a certain period of time in the above temperature range. Heating methods are not limited. However, for example, heating can be carried out by installing steam pipes to a container accommodating fish paste leaching waste water and introducing steam into the pipes. If heating is carried out at a temperature higher than 60° C., such as 90° C., the flocculation capacity of water-soluble proteins can be enhanced. For instance, when ash, which is unnecessary matter, is removed from waste liquid containing proteins, heating is preferably carried out at a temperature higher than 60° C. Meanwhile, when heating is carried out at high temperatures, properties of fish meat proteins from waste liquid might eventually deteriorate and become inappropriate for food. For instance, when a processed product such as steamed surimi fish paste (kamaboko) is produced using fish paste comprising proteins that have been recovered from fish paste leaching waste water after high temperature heating, such product has poor sensory properties such as color and texture and thus it is difficult to use it for food. Heating in the above temperature range enables the recovery of fish meat proteins that can be used for food.

In the case of stick water, heating may be carried out at 60° C. to 90° C. when recovering proteins. This is because as stick water is mainly used for fishmeal or the like, it is not expected to achieve high sensory evaluation scores for color, texture, or the like for a processed product of recovered proteins. It is also because, since stick water is cooking water, it has been already heated at a high temperature. Alternatively, stick water is cooled in advance and then heated to the above temperature.

Heating causes precipitated proteins to flocculate so as to form flocs.

Protein flocs formed after heating are recovered via solid-liquid separation. Solid-liquid separation is carried out using a decanter centrifuge. A decanter centrifuge is a centrifuge for continuous solid-liquid separation of solid content from liquid by centrifugal force. Such decanter has a rotary cylinder having a cylindrical part and a conical part and a screw conveyor that is built into the rotary cylinder. The screw conveyor rotates at a speed different from the speed of the rotary cylinder, thereby generating a centrifugal force of about 2,000-5,000 g for centrifugation. A liquid supply inlet for solid-liquid separation is located at the center of the rotary shaft of the rotary cylinder. Heat-treated liquid is supplied through the liquid supply inlet and retained in the rotary cylinder. The solid content of the liquid, which has a large specific gravity, is separated by centrifugal force so as to be deposited on the inner wall of an exterior rotary body, thereby achieving solid-liquid separation. The solid content that has been deposited inside the rotary body is scraped and transferred by the screw conveyor from the cylindrical part, in which separation is carried out, to the conical part, in which deliquoring is carried out, so as to be discharged outside the decanter centrifuge. The clarified liquid is transferred over a partition wall provided on the side opposite to the conical part side so as to be discharged outside the decanter centrifuge. Specifically, a decanter centrifuge is a device having a rotary container and a screw conveyor installed inside the container, which separates solid content from liquid such that the solid content is deposited on the inner wall of the container by centrifugation, and in which the solid content deposited on the inner wall of the container is continuously scraped out from the device by rotating the screw conveyor installed inside the container. A decanter centrifuge also can be called a "screw-conveyor discharge-type centrifuge." In order to improve processing capacity, a concentration centrifuge provided with a BD cone (baffle) is selected from among decanter centrifuges. A BD cone has a shape corresponding to the conical part of a rotary cylinder and is provided on the treated liquid supply inlet side of a screw conveyor. A BD cone smoothly supplies treated liquid into a bowl while preventing the treated liquid from being stirred so as to allow efficient solid-liquid separation by centrifugation. Also, a BD cone functions as a divider for preventing separated liquid from infiltrating concentrated solid content. The divider function allows concentrated solid content to be smoothly discharged outside the device due to the scraping force of the screw conveyor and pressure applied by the clarified liquid. A concentration centrifuge provided with a BD cone is used for a soft solid content comprising, for example, proteins, for which the transfer efficiency of a screw conveyor is low.

In addition, upon solid-liquid separation, if fish paste leaching waste water or stick water in which flocs have been formed is cooled, the state of flocculation is released. Therefore, solid-liquid separation is carried out using a decanter during heating of fish paste leaching waste water or stick water. In order to carry out solid-liquid separation during heating, fish paste leaching waste water or stick water that has been heated in the heating step is immediately introduced into a decanter centrifuge and solid-liquid separation is carried out before the temperature decreases. Solid-liquid separation during heating differs from pressure flotation used in conventional methods.

According to the present invention, proteins recovered from fish paste leaching waste water or stick water are used for food. Therefore, no flocculation agent is used in the recovering step. Examples of flocculation agents include inorganic flocculation agents and synthetic polymer flocculation agents such as those mainly containing polyaluminum chloride or the like. Hydrochloric acid or the like, which is used for pH adjustment, is not included in flocculation agents.

According to the above method, a fraction of large amounts of proteins contained in fish paste leaching waste water or stick water can be obtained.

The protein content in the fraction obtained from fish paste leaching waste water is 10% to 25% by weight and preferably 12.5% to 23.4% by weight of wet matter containing water. It is 80% to 90% by weight and preferably 82.8% to 87% by weight of dry matter obtained by drying wet matter. Further, the ash content in wet matter is 0.3% by weight or less. The ash content in dry matter is 3% by weight or less, and preferably 2% by weight or less, and more preferably 1.1% to 2% by weight.

The protein content in the fraction obtained from stick water is 10% to 18% by weight and preferably 14.8% by weight of wet matter containing water. It is 60% to 70% by weight and preferably 66.7% by weight of dry matter obtained by drying wet matter. Further, the ash content in wet matter is 1% by weight or less and preferably 0.6% by weight or less. The ash content in dry matter is 3% by weight or less and preferably 2.7% by weight or less.

The ash content in matter containing proteins recovered by the method of the present invention is obviously lower than that in matter containing proteins recovered by conventional techniques such as a pressure flotation method. The word "ash" used herein refers to an inorganic substance contained in food material, that is to say, mineral matter such as calcium, iron, or sodium. Proteins rich in ash (and especially those having high salt content) are problematic when used as food material. In addition, when proteins are used as fishmeal raw material, drying is carried out during the production process, which concentrates ash. This results in a high salt content in the obtained product. Further, a high ash content causes salt damage to devices due to the high salt content, which is problematic. Accordingly, it is preferable for the ash content in matter containing recovered proteins to be low. In this regard, the effects of the method of the present invention are superior to those of conventional methods.

Proteins recovered from fish paste leaching waste water by the method of the present invention can be added to fish paste. That is, they can be used for a fish paste filler. When a processed food such as steamed surimi fish paste is produced with fish paste containing proteins recovered by the method of the present invention, a processed product with high sensory evaluation scores for color, texture, and the like can be produced. Further, proteins recovered from fish paste leaching waste water can be used as fishmeal raw material.

Also, proteins recovered from stick water according to the method of the present invention can be used as fishmeal raw material.

EXAMPLES

The present invention is specifically described with reference to the Examples below. However, the present invention is not limited to the Examples.

Example 1

Recovery of Water-soluble Proteins from Fish Paste Waste Liquid and Properties of the Recovered Proteins (Method)

It was attempted to recover water-soluble proteins from water leaching waste liquid of fish paste. Leaching waste water (200 L) generated in the water leaching step of removing fat content and blood components was sampled upon production of Alaska pollack fish paste. The pH of each sample was adjusted to 5.0 using concentrated hydrochloric acid to precipitate water-soluble proteins. A tank in which the pH of waste liquid was adjusted was provided with steam pipes. Waste liquid was heated by introducing steam into the pipes to cause flocculation. After heating until the sample temperature reached 30° C., 60° C., or 90° C., each sample was supplied to a decanter centrifuge for solid-liquid separation. The measured values of solid contents recovered at different heating temperatures were as follows: 30° C. heating: 1.5 kg; 60° C. heating: 14.5 kg; and 90° C. heating: 6.0 kg. The protein concentration in waste liquid and the protein concentration in separated liquid obtained after solid-liquid separation were determined by the Biuret test to obtain the recovery rates. In addition, the solid obtained after solid-liquid separation was recovered and subjected to general component analysis, and it was also added as a filler to fish paste to result in a content of 20%. Then, sensory evaluation of steamed surimi fish paste prepared by an ordinary method was conducted.

(Results)

Both the recovery rates for 60° C. heating and 90° C. heating were about 80%. Meanwhile, the recovery rate for 30° C. heating was about 30% (FIG. 1). In addition, matter recovered after 90° C. heating had a low moisture content but a high protein content (Table 1). As a result, the elasticity of steamed surimi fish paste increased. However, high temperature heating caused excessive flocculation, which resulted in poor sensory performance such as unfavorable texture and color. Meanwhile, matter recovered after 60° C. heating was found to have favorable sensory performance compared with matter recovered after 90° C. heating (Table 2). In Table 2, the "○" symbol represents a very good feature, the "Δ" symbol represents a fair feature, and the "x" symbol represents a poor feature. The "x" symbol for evaluation means lack of marketability and lack of significance of practical use.

TABLE 1

Comparison of general components between matter containing proteins recovered after 60° C. heating and matter containing proteins recovered after 90° C. heating

| Sample name | | Moisture | Protein | Ash | Lipid | Carbohydrate | Salt content |
|---|---|---|---|---|---|---|---|
| Matter recovered after 60° C. heating | Content (%) in wet matter | 84.9 | 12.5 | 0.3 | 0.1 | 2.2 | 0.1 |
| | Content (%) in dry matter | | 82.8 | 2 | 0.7 | 14.6 | 0.7 |
| Matter recovered after 90° C. heating | Content (%) in wet matter | 73.1 | 23.4 | 0.3 | 0.4 | 2.8 | 0.1 |

TABLE 1-continued

Comparison of general components between matter containing proteins recovered after 60° C. heating and matter containing proteins recovered after 90° C. heating

| Sample name | | Mois-ture | Protein | Ash | Lipid | Carbo-hydrate | Salt content |
|---|---|---|---|---|---|---|---|
| | Content (%) in dry matter | | 87.0 | 1.1 | 1.5 | 10.4 | 0.4 |

TABLE 2

Evaluation and comparison of matter recovered after 60° C. heating and matter recovered after 90° C. heating

| Sample | Elasticity | Color | Sensory evaluation | Overall evaluation |
|---|---|---|---|---|
| Matter recovered after 60° C. heating | Δ | ○ | ○ | ○ |
| Matter recovered after 90° C. heating | ○ | x | x | x |

Example 2

Recovery of Water-soluble Proteins from Stick Water (Method)

It was attempted to recover water-soluble proteins from stick water. Stick water is waste liquid that is generated upon production of fishmeal from residue such as heads, backbones, and visceral organs obtained through the production of fish paste or fillets. The pH of stick water (200 L) discharged as cooking water during steam cooking of residue obtained at an Alaska pollack fish paste factory was adjusted to pH 5.0 using concentrated hydrochloric acid to precipitate water-soluble proteins. A tank in which the pH of waste liquid was adjusted was provided with steam pipes. Steam was introduced into the pipes to heat waste liquid so as to cause flocculation. The heating temperature was set to 90° C. in consideration of conditions during the production process in practice. After the temperature reached to a predetermined level, the waste liquid was supplied to a decanter centrifuge for solid-liquid separation. The TS (total solid) concentration of waste liquid and the TS concentration of separated liquid obtained after solid-liquid separation were calculated using the industrial wastewater testing method (JIS K0102 14.2) to obtain the recovery rate.

(Results)

Figure 2:
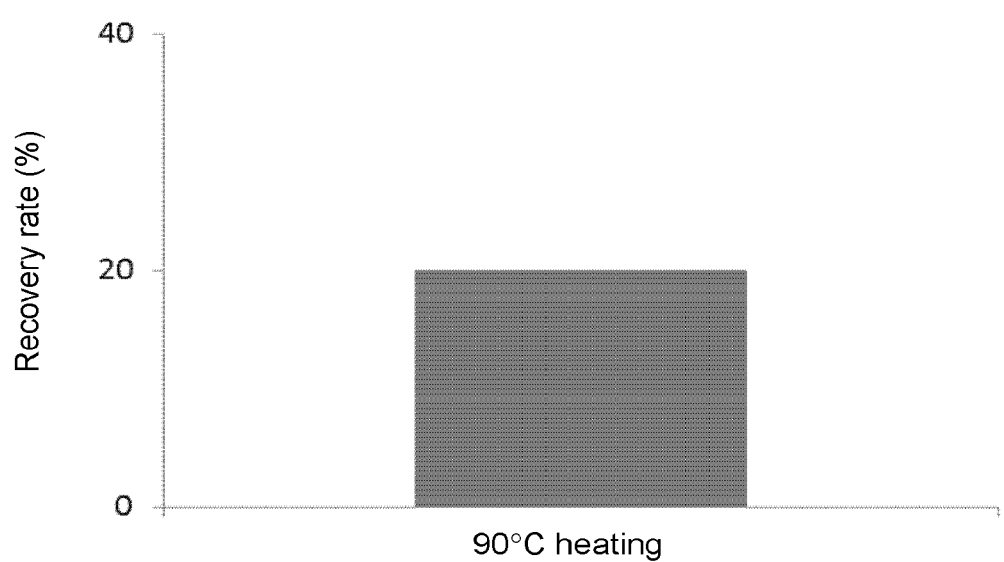
FIG. 2 shows the recovery rate of the water-soluble protein from stick water.

Although the recovery rate was about 20% which was lower than the figure for fish paste waste liquid (FIG. 2), water-soluble proteins could be recovered (Table 3).

TABLE 3

General components of matter containing proteins recovered from stick water

| Sample name | | Mois-ture | Protein | Ash | Lipid | Carbo-hydrate | Salt content |
|---|---|---|---|---|---|---|---|
| Matter containing proteins recovered from stick water | Content (%) in wet matter | 77.8 | 14.8 | 0.6 | 3.6 | 3.2 | 0.4 |
| | Content (%) in dry matter | | 66.7 | 2.7 | 16.2 | 14.4 | 1.8 |

Example 3

Comparison of General Components Between Water-soluble Proteins Recovered Using the Method of the Present Invention and Those Recovered Using a Conventional Method (Method)

General components of matter containing proteins that had been recovered using the following pretreatment for solid-liquid separation of water-soluble proteins from water leaching waste liquid with the use of a decanter were compared: (1) pH shift alone (pH 7.0→2.0 (adjusted with 3N hydrochloric acid)→5.0 (adjusted with 3N sodium hydroxide)); and (2) pH shift (pH 7.0→2.0→5.0)+90° C. heating. Further, the method of the present invention was compared with a conventional solid-liquid separation method involving pressure flotation, which comprises mixing a solution obtained after a pH shift with pressurized air to allow fine air bubbles to adhere to precipitated proteins, thereby separating the proteins from water (JP Patent Publication (Kokai) No. 2003-251365).

In addition, according to the method of the present invention, pH is adjusted to about pH 5 via a one-stage pH shift. Note that in this Example, pH was adjusted via a two-stage pH shift. This is because this Example was conducted to compare the method for recovering proteins of the present invention with the conventional method in terms of effects of solid-liquid separation.

(Results)

The moisture content remaining in matter containing proteins recovered via pressure flotation was found to be high. As a result, the protein content was low while the ash content and salt content were high. Meanwhile, matter containing proteins recovered by a decanter centrifuge were found to have been sufficiently dewatered. In this case, the protein content was high while the ash content and salt content were low (Table 4).

TABLE 4

Comparison of component analysis values of matter containing proteins recovered by different methods

| Sample name | | Mois-ture | Protein | Lipid | Carbo-hydrate | Ash | Salt content |
|---|---|---|---|---|---|---|---|
| pH shift alone | Content (%) in wet matter | 89.5 | 8.6 | 0.4 | 1.1 | 0.4 | 0.3 |
| | Content (%) in dry matter | — | 81.9 | 3.8 | 10.5 | 3.8 | 2.9 |

TABLE 4-continued

Comparison of component analysis values of matter containing proteins recovered by different methods

| Sample name | | Moisture | Protein | Lipid | Carbohydrate | Ash | Salt content |
|---|---|---|---|---|---|---|---|
| pH shift + heating | Content (%) in wet matter | 73.1 | 23.4 | 0.4 | 2.8 | 0.3 | 0.1 |
| | Content (%) in dry matter | — | 87.0 | 1.5 | 10.4 | 1.1 | 0.4 |
| pH shift + pressure flotation | Content (%) in wet matter | 98.6 | 1.2 | 0.04 | 0.0 | 0.27 | 0.2 |
| | Content (%) in dry matter | — | 79.5 | 2.6 | 0.0 | 17.9 | 11.1 |

INDUSTRIAL APPLICABILITY

According to the method of the present invention, useful proteins contained in waste liquid that is discharged during the water leaching step for fish paste production and stick water that is discharged during fishmeal production can be recovered at high recovery rates.

All publications, patents, and patent applications cited herein are incorporated herein by reference in their entirety.

The invention claimed is:

1. A method for recovering water-soluble proteins from fish paste leaching waste water or stick water, the method consisting of:

adjusting the pH of fish paste leaching waste water or stick water to 4.5-5.5 via a one-stage pH adjustment to insolubilize water-soluble proteins;

heating the insolubilized proteins to 50° C. to 60° C. to cause the proteins to flocculate so as to form flocs; and subjecting the flocs to solid-liquid separation using a decanter centrifuge during heating; and recovering proteins in the form of solid content.

2. The method according to claim 1, wherein the ash content in matter comprising recovered proteins accounts for 3% by weight or less of matter comprising recovered proteins after drying.

3. A method for producing fish paste, comprising adding water-soluble proteins to a fish paste, wherein the water-soluble proteins have been obtained by a process consisting of adjusting the pH of fish paste leaching waste water or stick water to 4.5-5.5 via a one-stage pH adjustment to insolubilize water-soluble proteins;

heating the insolubilized proteins to 50° C. to 60° C. to cause the proteins to flocculate so as to form flocs; and subjecting the flocs to solid-liquid separation using a decanter centrifuge during heating; and recovering proteins in the form of solid content.

4. A method for producing fishmeal, comprising adding water-soluble proteins to a fishmeal, wherein the water-soluble proteins have been obtained by a process consisting of adjusting the pH of fish paste leaching waste water or stick water to 4.5-5.5 via a one-stage pH adjustment to insolubilize water-soluble proteins;

heating the insolubilized proteins to 50° C. to 60° C. to cause the proteins to flocculate so as to form flocs; and subjecting the flocs to solid-liquid separation using a decanter centrifuge during heating; and recovering proteins in the form of solid content.

* * * * *